3,210,400
ACETAMIDO - AMINOCAPRONITRILE, METHOD OF MAKING AND INTERMEDIATES THEREFOR
Elvin K. Brakebill, Chesterfield County, Va., assignor to Allied Chemical Corporation, New York, N.Y., a corporation of New York
No Drawing. Filed May 18, 1961, Ser. No. 110,863
5 Claims. (Cl. 260—465.4)

This invention relates to a process for preparing a novel acetamido-aminocapronitrile and to a series of novel lysine intermediates.

I have discovered that a novel acetamido-aminocapronitrile can be prepared by a series of reactions using readily available materials starting with allyl cyanide.

The novel acetamido-aminocapronitrile of my invention has particular utility for the production of DL-lysine, which can be prepared from it by simple acid hydrolysis.

The reactions of my invention involve briefly (1) reacting in lower alkanol medium, allyl cyanide with carbon monoxide and hydrogen to produce γ-cyanobutyraldehyde dimethyl acetal, I; (2) hydrogenating γ-cyanobutyraldehyde dimethyl acetal by reacting it with hydrogen in the presence of a metallic hydrogenation catalyst and ammonia to yield δ-aminovaleraldehyde dimethyl acetal, II; (3) acylation of δ-aminovaleraldehyde dimethyl acetal by reaction with an acylating agent such as acetic anhydride to produce δ-acetamidovaleraldehyde dimethyl acetal, III; (4) hydrolysis of the δ-acetamidovaleraldehyde dimethyl acetal to produce δ-acetamidovaleraldehyde, IV; (5) reacting δ-acetamidovaleraldehyde with hydrocyanic acid and ammonia to produce ε-acetamido-α-aminocapronitrile, V. In place of methanol to produce the diacetal in step 1, any suitable lower alkanol may be used.

The reactions in this synthesis are set forth below:

(1)
$$NC-CH_2-CH=CH_2 + 2CH_3OH + CO + H_2 \longrightarrow$$
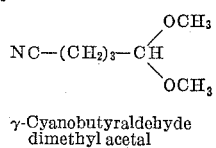

allyl cyanide      γ-Cyanobutyraldehyde dimethyl acetal (I)

(2)
$$NC-(CH_2)_3-CH(OCH_3)_2 + 2H_2 \longrightarrow H_2N-(CH_2)_4-CH(OCH_3)_2$$
δ-Aminovaleraldehyde dimethyl acetal (II)

(3)
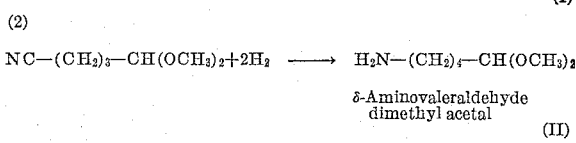
δ-Acetamidovaleraldehyde dimethyl acetal (III)

(4)
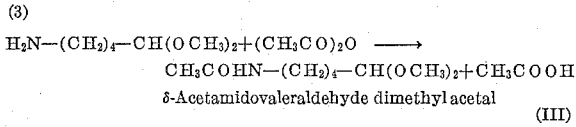
δ-Acetamidovaleraldehyde (IV)

(5)
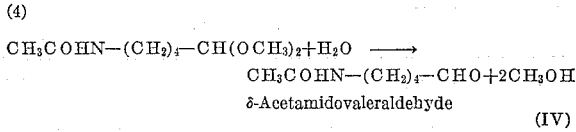
ε-Acetamido-α-aminocapronitrile (V)

The nitrile can be hydrolyzed to lysine according to the following equation:

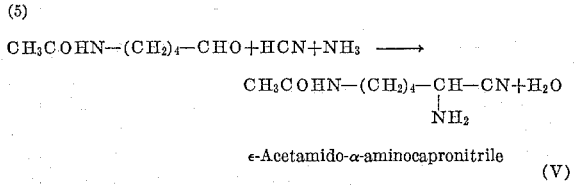
2,6-diaminocaproic acid DL-lysine·HCl

A general outline of my process is given below.

The first step of my process can be carried out by the carbonylation of allyl cyanide with carbon monoxide and hydrogen in the presence of methanol and a carbonylation catalyst such as cobalt, thorium, manganese, iron or mixtures thereof. This reaction yields primarily γ-cyanobutyraldehyde dimethyl acetal (Compound Number I in Equation 1 above). The reaction also yields a smaller proportion of the isomeric α-methyl-β-cyanopropionaldehyde dimethyl acetal, which does not appear to interfere in any way with subsequent reactions.

It is known to carry out the carbonylation of allyl cyanide to produce γ-cyanobutyraldehyde. However, in my process involving co-reaction with methanol, the dimethyl acetal is formed instead of the aldehyde, thereby promoting conversion to the useful isomer at the expense of the other.

In general, the reaction may be carried out by suspending the catalyst, which may be on a carrier such as kieselguhr impregnated with one or more of the carbonylation catalysts noted above, for example, kieselguhr, impregnated with between about 20 and about 60 parts of cobalt, with or without traces of thorium, manganese or iron, in a solution of from about 1.2 to about 2.8 mols of allyl cyanide and between about 4.5 and about 44 mols of methanol in a rocking autoclave, then admitting the carbonylation mixture of carbon monoxide and hydrogen which can be a conventional ammonia synthesis gas (e.g. 30% carbon monoxide, 65% hydrogen and 5% carbon dioxide), to a pressure of between about 3,000 and about 10,000 p.s.i.g. The strongly exothermic reaction is held at a temperature betwen about 100° and about 175° C. until completion, usually about a half hour. The mixed isomers are usually thus obtained in the proportion of about two parts of the γ-cyano isomer (Compound No. I) and about one part of the β-cyano isomer. The isomers may be separated, but this is not necessary and I prefer to use the mixed reaction product obtained as outlined above, in the subsequent reactions.

Reaction (2) above involves the hydrogenation of γ-cyanobutyraldehyde dimethyl acetal (Compound No. I) to δ-aminovaleraldehyde dimethyl acetal, Compounl II, by hydrogenating the nitrile group with hydrogen which may, if desired, be carried out in the presence of excess ammonia, to give the primary amine. This can be accomplished by the use of alcoholic, aqueous or anhydrous ammonia in the presence of Raney nickel or other conventional hydrongenation catalysts, for example, of nickel, copper, manganese or mixtures of such catalysts. In general, satisfactory results are obtained by mixing in the hydrogenator between about 0.04 part and about 0.12 part of Raney nickel or other catalyst per part of γ-cyanobutyraldehyde dimethyl acetal. The latter may be added dry or mixed in methanol or water. If ammonia is to be used, it is next added, for example, in amounts up to about 25 parts per part of acetal, and the reactor is then pressurized to between about 1,400 p.s.i.g. and about 2,000 p.s.i.g. with hydrogen, usually about 5 parts hydrogen per part of acetal being sufficient. Reaction takes place at between about 60° and about 150° C. yielding δ-aminovaleraldehyde dimethyl acetal (Compound No. II). This compound is a mobile liquid boiling at 78–80° C. at 10 mm. Hg pressure. It is soluble in methyl alcohol, ethyl alcohol and ether.

Reaction No. 3 involves blocking the amino group of the δ-aminovaleraldehyde dimethyl acetal prior to freeing the aldehyde group for further reaction, in order to obtain high yields of the desired products in the subsequent steps. This may be accomplished by reacting the δ-aminovaleraldehyde dimethyl acetal with any of the common acylating agents such as lower aliphatic carboxylic acid anhydrides or ketene. Acetic anhydride is convenient and preferred. Thus an equivalent to slight excess of acetic anhydride or other acylating agent is added to the amino acetal over a 0.5 to 1.0 hour period at 30° to 100° C., and the reaction mixture agitated for about 0.25 to 2.0 hours, which usually is sufficient to give substantially quantitative yield of δ-acetamidovaleraldehyde dimethyl acetal, III. This product is a new compound which is a viscous colorless oil boiling at 126°–131° C. at 0.2 to 0.4 mm. Hg pressure, soluble in ether, methyl alcohol and ethyl alcohol.

Reaction No. 4, involving the hydroylsis of the δ-acetamidovaleraldehyde dimethyl acetal to split off the acetal groups and free the aldehyde for further reaction, is carried out at a relatively low temperature, for example, not more than about 40° C., in order not to cleave the amide linkage. The reaction proceeds readily at normal room temperatures, e.g., about 20 to 25° C. Temperatures between about 0° C. and about 40° C. are satisfactory. In carrying out this reaction one part of δ-acetamidovaleraldehyde dimethyl acetal is mixed with between about 0.07 part and about 1.0 part of a strong mineral acid such as hydrochloric, sulfuric, etc., acid in aqueous solution and allowed to react for between about 0.1 and about 1.0 hour. The free aldehyde is thus regenerated substantially quantitatively.

In reaction 5, the aldehyde solution from reaction 4 is used directly without separation or isolation of the aldehyde. In this reaction, one part of δ-acetamidovaleraldehyde is mixed with between about 1 part and about 2 parts of hydrogen cyanide, and between about 20 parts and about 100 parts of ammonia and allowed to react for a period of between about 1 hour and about 4 hours at a temperature between about 25° C. and about 100° C. After the reaction is complete, the solution is concentrated as by evaporation of water at low temperature under reduced pressure to yield the oily product ε-acetamido-α-aminocapronitrile. This compound is a new composition of matter, V.

The valuable nutrient, lysine, may be prepared by the hydrolysis of ε-acetamido-α-aminocapronitrile to simultaneously split off the acyl group and hydrolyze the nitrile group to carboxyl. This hydrolysis may be carried out by adding to the solution resulting from reaction 5, a small quantity of mineral acid such as hydrochloric or sulfuric acid in amounts between about 0.07 part and about 1.0 part per part of ε-acetamido-α-aminocapronitrile, and maintaining the solution at elevated temperature, e.g., 100° C. to 150° C. for between about 2 hours and about 10 hours, for example, under refluxing. The resulting hydrolysate contains DL-lysine salt and can be concentrated in conventional manner as by evaporation to dryness under reduced pressure. The DL-lysine salt is dissolved in hot alcohol, and inorganic salts removed as by filtration of the hot solution. It is then precipitated by the addition of an organic base, for example, aniline, pyridine, methylamine or the like.

The new intermediate, δ-acetamidovaleraldehyde dimethyl acetal, may be converted to lysine without producing ε-acetamido-α-aminocapronitrile by hydrolyzing in accordance with step 4 above, then continuing as described in my copending application Serial No. 110,864 filed of even date herewith and now abandoned to react the resulting δ-acetamidovaleraldehyde with an alkali metal cyanide (instead of hydrogen cyanide as described herein) and with ammonium ions and carbonate ions to produce 5-(acetamidobutyl) hydantoin and hydrolyzing the latter compound to lysine.

The following specific examples further illustrate my invention. Parts are by weight except as otherwise noted.

EXAMPLE 1

*Synthesis of γ-cyanobutyraldehyde dimethyl acetal I*

To a 1040 ml. stainless steel autoclave containing 550 ml. of methanol and 20.3 g. of a cobalt-thorium catalyst (36% cobalt-7% thorium-57% Filter Cell) was added 74 ml. of allyl cyanide. The system was pressurized to 340 atmospheres with 5.58 mols of ammonia synthesis gas containing approximately 30% carbon monoxide, 65.4% hydrogen and 4.6% carbon dioxide. The mixture was heated, while rocking, to approximately 120° C. (pressure 400 atm.) at which temperature a noticeable reaction occurred. The temperature increased rapidly to 155° C. while the pressure decreased to 275 atmospheres. Heat input to the reactor was cut off when the reaction started. Approximately 0.5 hour reaction time was required after the initial pressure drop to reach a steady pressure of 275 atmospheres. The reaction mixture was cooled to 30° C. The unreacted synthesis gas was vented, reaction mixture filtered to remove the catalyst and the filter cake washed with 132 ml. of methanol. The combined filtrate was evaporated at 25 mm. pressure and 40–55° C. where methanol, water and by-product butyronitrile were removed. The high boiling product was distilled at 70–80° C. and 1–2 mm. pressure through a twelve inch Vigreux column to give 90 g. of product consisting of approximately 60 g. γ-cyanobutyraldehyde dimethyl acetal (I) and 30 g. α-methyl-β-cyanopropionaldehyde dimethyl acetal (Ia). Elemental analyses are given below for γ-cyanobutyraldehyde dimethyl acetal (I) mixed with its isomer (Ia):

|  | Carbon | Hydrogen | Nitrogen |
| --- | --- | --- | --- |
| Calculated, percent | 58.7 | 9.14 | 9.79 |
| Found, percent | 58.6 | 9.27 | 9.74 |

EXAMPLE 2

*Synthesis of δ-aminovaleraldehyde dimethyl acetal II*

A 1040 ml. stainless steel autoclave was charged with 91 ml. of the mixed cyano acetals obtained in Example 1, 100 ml. of methanol and 7.1 g. of Raney Ni (W-7). To this mixture was added 63 g. of liquid ammonia. The autoclave was pressurized with hydrogen to 1500 p.s.i.g. The mixture was heated while rocking to reaction temperature of approximately 90° C. at which the pressure was 1710 p.s.i.g. The absorption of hydrogen was slow and required a reaction time of 1.5 hours once the reaction was initiated. The reaction mixture was cooled to 30° C. (pressure=800 p.s.i.g.) and the hydrogen and ammonia vented. The catalyst was removed by filtration and the filtrate evaporated at 25–40° C. under reduced pressure through a 12 inch Vigreux column to remove the methanol and residual ammonia. The residue was then distilled at 78–80° C. and 10 mm. Hg pressure to give 86.6 g. of amino-acetals, $N_D^{20}$ 1.4340. Elemental analyses of this mixture are given below:

|  | Carbon | Hydrogen | Nitrogen |
| --- | --- | --- | --- |
| Calculated, percent | 57.11 | 11.64 | 9.51 |
| Found, percent | 56.82 | 11.77 | 9.53 |

EXAMPLE 3

*Synthesis of δ-acetamidovaleraldehyde dimethyl acetal III*

A three-neck flask fitted with a thermometer, stirrer and dropping funnel was charged with 147 g. of the δ-aminovaleraldehyde dimethyl acetal solution obtained in Example 2, and 102.3 g. of acetic anhydride was added slowly over 0.5 hour with stirring and cooling to maintain the temperature at 30° C. After completion of the addition, the reaction mixture was stirred for 1.0 hour. The acetic acid and excess acetic anhydride were removed by distillation at 25–50 mm. pressure. The residual viscous oil was distilled at 126–131° C. and 0.2–0.4 mm. Hg pressure to give 179.9 g. of the δ-acetamidovaleraldehyde dimethyl acetal. Elemental analyses of this mixture are given below:

|  | Carbon | Hydrogen | Nitrogen |
| --- | --- | --- | --- |
| Calculated, percent | 57.1 | 10.10 | 7.41 |
| Found, percent | 56.97 | 10.03 | 7.33 |

EXAMPLE 4

*Synthesis of δ-acetamidovaleraldehyde IV*

To a solution of 5 parts of the δ-acetamidovaleraldehyde dimethyl acetal prepared as described in Example 3 above, in 10–15 ml. of water was added 0.05 ml. of concentrated sulfuric acid and the reaction mixture stirred 0.25 hr. The solution had an aldehyde content f 99–100% indicating substantially complete conversion to δ-acetamidovaleraldehyde.

EXAMPLE 5

*Synthesis of ε-actamido-α-aminocapronitrile V*

The hydrolyzate from the above Example 4 containing 0.057 mol of δ-acetamidovaleraldehyde was diluted with 20 ml. water and charged to a stainless steel autoclave. To this solution was added 3.4 ml. of hydrogen cyanide and 80 g. ammonia. The reaction mixture was then heated at 60° C. for 2 hours while rocking. The ammonia and hydrogen cyanide were vented and the remaining solution evaporated at 50–60° C. and 55–90 mm. Hg pressure to remove practically all the ammonia, hydrogen cyanide and methanol. The resulting ε-acetamido-δ-aminocapronitrile product was an oil.

EXAMPLE 6

*Production of 2,6-diaminocaproic acid hydrochloride*

The oily ε-acetamido-α-aminocapronitrile product obtained in the reaction described in Example 5, was hydrolyzed by refluxing 8 hours with 100 ml. concentrated hydrochloric acid. The mixture was then evaporated to dryness in vacuo on a steam bath. The resulting 2,6-diaminocaproic acid hydrochloride, i.e.

DL-lysine·2HCl in the residue was extracted with 50 ml. of hot 95% ethanol, the mixture filtered to remove ammonium chloride and the filtrate treated with pyridine to precipitate DL-lysine·HCl. Filtration and recrystallization gave high purity product.

While the above describes the preferred embodiments of the invention, it will be understood that departures may be made therefrom within the scope of the specification and claims.

I claim:

1. ε-Acetamido-α-aminocapronitrile.
2. The process for the production of ε-acetamido-α-aminocapronitrile which comprises (1) subjecting a mixture of allyl cyanide and a lower alkanol in mol ratio between about 1.2 and about 2.8 mols of allyl cyanide to between about 4.5 mols and about 44 mols of alkanol to the action of a mixture of carbon monoxide and hydrogen at a temperature between about 100° C. and about 175° C. and pressure between about 3,000 p.s.i.g. and about 10,000 p.s.i.g. in the presence of a carbonylation catalyst selected from the group consisting of cobalt, thorium, manganese, iron and mixtures thereof until γ-cyanobutyraldehyde lower alkyl acetal has formed; (2) subjecting the thus produced γ-cyanobutyraldehyde lower alkyl acetal to the action of hydrogen at temperatures between about 60° C. and about 150° C. and pressures between about 1,400 p.s.i.g. and about 2,000 p.s.i.g. in the presence of a hydrogenation catalyst selected from the group consisting of nickel, copper, manganese and mixtures thereof until δ-amino-valeraldehyde lower dialkyl acetal has formed; (3) reacting the δ-aminovaleraldehyde lower dialkyl acetal with one molecular equivalent to a slight molecular excess amount of an acylating agent selected from the group consisting of acetic anhydride and ketene at temperatures between about 30° C. and about 100° C. until the corresponding acylamino compound has formed; (4) mixing the thus produced δ-lower acylaminovaleraldehyde lower dialkyl acetal with a small amount of a mineral acid in aqueous solution and maintaining said mixture at temperatures between about 0° C. and about 40° C. until the alkyl acetal group has split off; (5) mixing the δ-lower acylaminovaleraldehyde with between about 1 part and about 2 parts of hydrogen cyanide and between about 20 parts and about 100 parts of ammonia and maintaining the mixture at a temperature between about 25° C. and about 100° C. until ε-acetamino-α-aminocapronitrile has formed.
3. The process for the production of ε-acetamido-α-aminocapronitrile which comprises (1) subjecting a mixture of allyl cyanide and methanol in mol ratio between about 1.2 and about 2.8 mols of allyl cyanide to between about 4.5 mols and about 44 mols of methanol to the action of a mixture of carbon monoxide and hydrogen at a temperature between about 100° C. and about 175° C. and pressure between about 3,000 p.s.i.g. and about 10,000 p.s.i.g. in the presence of a carbonylation catalyst selected from the group consisting of cobalt, thorium, manganese, iron and mixtures thereof until γ-cyanobutyraldehyde dimethyl acetal has formed; (2) subjecting the thus produced γ-cyanobutyraldehyde dimethyl acetal to the action of hydrogen at temperatures between about 60° C. and about 150° C. and pressures between about 1,400 p.s.i.g. and about 2,000 p.s.i.g. in the presence of a hydrogenation catalyst selected from the group consisting of nickel, copper, manganese and mixtures thereof until δ-aminovaleraldehyde dimethyl acetal has formed; (3) reacting the δ-aminovaleraldehyde dimethyl acetal with from one molecular equivalent to a slight molecular excess of an acylating agent selected from the group consisting of acetic anhydride and ketene at temperatures between about 30° C. and about 100° C. until the corresponding acetamido compound has formed; (4) mixing the thus produced δ-acetamidovaleraldehyde dimethyl acetal with a small amount of a mineral acid in aqueous solution and maintaining said mixture at temperatures between about 0° C. and about 40° C. until the dimethyl acetal groups have split off; (5) mixing the δ-acetamidovaleraldehyde with between about 1 part and about 2 parts of hydrogen cyanide and between about 20 parts and about 100 parts of ammonia and maintaining the mixture at a temperature between about 25° C. and about 100° C. until ε-acetamido-α-aminocapronitrile has formed.
4. δ-acetamidovaleraldehyde dimethyl acetal.
5. The process for producing δ-acetamidovaleraldehyde which comprises (1) subjecting a mixture of allyl cyanide and a lower alkanol in mol ratio of between about 1.2 and about 2.8 mols of allyl cyanide to between about 4.5 mols and about 44 mols of alkanol to the action of a mixture of carbon monoxide and hydrogen at a temperature between about 100° C. and about 175° C. and pressures between about 3,000 p.s.i.g. and about 10,000 p.s.i.g. in the presence of a carbonylation catalyst selected from the group consisting of cobalt, thorium, manganese, iron and mixtures thereof until γ-cyanobutyraldehyde lower alkyl acetal has formed; (2) subjecting the thus produced γ-cyanobutyraldehyde lower alkyl acetal to the action of hydrogen at temperatures between about 60° C. and about 150° C. and pressures between about 1,400 p.s.i.g. and about 2,000 p.s.i.g. in the presence of a hydrogenation catalyst selected from the group consisting of nickel, copper, manganese and mixtures thereof until δ-aminovaleraldehyde lower dialkyl acetal has formed; (3) reacting the δ-aminovaleraldehyde lower dialkyl acetal with one molecular equivalent to a slight molecular excess amount of an acetylating agent selected from the group consisting of acetic anhydride and ketene at temperatures between about 30° C. and about 100° C. until δ-acetamidovaleraldehyde lower dialkyl acetal has formed; (4) mixing the thus produced δ-acetamidovaleraldehyde lower dialkyl acetal with a small amount of a mineral acid in aqueous solution and maintaining said mixture at temperatures between about 0° C. and about 40° C. until the alkyl acetal group has split off leaving δ-acetamidovaleraldehyde.

References Cited by the Examiner

UNITED STATES PATENTS

| | | | |
|---|---|---|---|
| 1,534,525 | 4/25 | Hartmann et al. | 260—561 XR |
| 2,166,150 | 7/39 | Howk | 260—583 |
| 2,485,236 | 10/49 | Gresham et al. | 260—465.5 XR |
| 2,842,576 | 7/58 | Habeshaw et al. | 260—465.6 XR |

OTHER REFERENCES

Beilstein: volume 4, 2nd supplement, 1942, page 765.

Koichi et al.: C.A., 49, 1955, page 1693.

Lukes et al.: Chemical Abstracts, vol. 50, 1956, page 7796c.

Royals: "Advanced Organic Chemistry," 1954, Prentice-Hall, Englewood Cliffs, N.J., pages 628–629.

CHARLES B. PARKER, *Primary Examiner.*